(12) United States Patent
Fujita et al.

(10) Patent No.: US 8,983,280 B2
(45) Date of Patent: Mar. 17, 2015

(54) COATED FILM DRYING FURNACE

(75) Inventors: Yuuki Fujita, Nagoya (JP); Yoshio Kondo, Nagoya (JP); Michiro Aoki, Obu (JP)

(73) Assignee: NGK Insulators, Ltd., Nagoya (JP)

( * ) Notice: Subject to any disclaimer, the term of this patent is extended or adjusted under 35 U.S.C. 154(b) by 114 days.

(21) Appl. No.: 13/604,806

(22) Filed: Sep. 6, 2012

(65) Prior Publication Data

US 2012/0328272 A1      Dec. 27, 2012

Related U.S. Application Data

(63) Continuation-in-part of application No. PCT/JP2011/059357, filed on Apr. 15, 2011.

(30) Foreign Application Priority Data

Apr. 30, 2010   (JP) .................................. 2010-104729
Dec. 2, 2010    (JP) .................................. 2010-269167

(51) Int. Cl.
*A21B 2/00*     (2006.01)
*F21V 7/00*     (2006.01)
*F26B 13/10*    (2006.01)
*F26B 3/30*     (2006.01)

(52) U.S. Cl.
CPC .. *F26B 13/10* (2013.01); *F26B 3/30* (2013.01)
USPC ............................ 392/416; 392/417; 392/424

(58) Field of Classification Search
None
See application file for complete search history.

(56) References Cited

U.S. PATENT DOCUMENTS

| 3,364,062 | A | * | 1/1968 | Reid et al. ...................... 427/542 |
| 4,101,424 | A | * | 7/1978 | Schooley et al. ......... 250/504 R |
| 4,257,172 | A | * | 3/1981 | Townsend .......................... 34/68 |
| 4,551,925 | A | * | 11/1985 | Ericsson ........................ 34/275 |
| 4,727,655 | A | * | 3/1988 | Jacobi, Jr. ...................... 34/266 |
| 4,756,091 | A | * | 7/1988 | Van Denend ................... 34/266 |
| 4,894,517 | A | * | 1/1990 | Oguri ............................ 219/388 |
| 4,965,434 | A | * | 10/1990 | Nomura et al. ............... 392/407 |

(Continued)

FOREIGN PATENT DOCUMENTS

| JP | 58-102482 A1 | 6/1983 |
| JP | 62-097324 A1 | 5/1987 |

(Continued)

OTHER PUBLICATIONS

International Search Report dated Jul. 12, 2011 (with English translation).

(Continued)

*Primary Examiner* — Thor Campbell
(74) *Attorney, Agent, or Firm* — Burr & Brown, PLLC

(57) ABSTRACT

A coated film drying furnace for drying a coated film inside a furnace body by conveying the coated film therein, the coated film having an absorption spectrum for electromagnetic waves of 3.5 μm or less and having hydrogen bonds, such as an electrode coated film for lithium ion battery. Infrared heaters provided inside a furnace body have outer circumferences of filaments concentrically covered by tubes that function as a low pass filter, and have a structure in which a fluid flow passage is formed between the plurality of tubes. Due to this, a temperature rise in the furnace is controlled so as to prevent explosion of an organic solvent vapor, and the coated film is efficiently heated and dried by intensively radiating near infrared rays of 3.5 μm or less that have superior ability to cut off the intermolecular hydrogen bonds onto a work.

7 Claims, 8 Drawing Sheets

(56) References Cited

U.S. PATENT DOCUMENTS

| | | | | |
|---|---|---|---|---|
| 5,180,096 | A | * | 1/1993 | Kondo ................. 228/180.1 |
| 5,323,546 | A | * | 6/1994 | Glover et al. ................ 34/267 |
| 5,382,805 | A | * | 1/1995 | Fannon et al. ........... 250/504 R |
| 5,559,924 | A | | 9/1996 | Kadotani et al. |
| 5,951,896 | A | * | 9/1999 | Mahawili ................. 219/411 |
| 6,026,748 | A | * | 2/2000 | Reed et al. ................ 101/424.1 |
| 6,058,621 | A | * | 5/2000 | Piccinino et al. ............. 34/273 |
| 6,399,955 | B1 | * | 6/2002 | Fannon .................. 250/504 R |
| 6,713,945 | B2 | * | 3/2004 | Fuchs et al. ................ 313/113 |
| 6,909,841 | B2 | * | 6/2005 | Linow et al. ............... 392/407 |
| 7,215,879 | B2 | * | 5/2007 | Morikawa et al. ........... 392/407 |
| 7,514,650 | B2 | * | 4/2009 | Melgaard et al. ........... 219/388 |
| 8,670,656 | B2 | * | 3/2014 | Nishida et al. ............. 392/483 |
| 2002/0033134 | A1 | | 3/2002 | Fannon |
| 2004/0175162 | A1 | * | 9/2004 | Linow et al. ............... 392/424 |
| 2010/0167224 | A1 | * | 7/2010 | Nakano et al. .............. 432/246 |
| 2012/0063754 | A1 | * | 3/2012 | Nishida et al. .............. 392/424 |

FOREIGN PATENT DOCUMENTS

| | | |
|---|---|---|
| JP | 08-035724 A1 | 2/1996 |
| JP | 2583159 B2 | 2/1997 |
| JP | 2001-216958 A1 | 8/2001 |
| JP | 2002-170556 A1 | 6/2002 |
| JP | 2002-324548 A1 | 11/2002 |
| JP | 2004-273453 A1 | 9/2004 |
| JP | 2006/108010 | 4/2006 |
| JP | 2006-294337 A1 | 10/2006 |
| WO | WO 2008/002904 A2 | 1/2008 |

OTHER PUBLICATIONS

Chinese Office Action (Application No. 20118001935.1) dated Jun. 10, 2014.

Extended European Search Report mailed Jan. 16, 2015 from a corresponding European Patent Application, 6 pages.

* cited by examiner

COATED FILM DRYING FURNACE

TECHNICAL FIELD

The present invention relates to a coated film drying furnace used for a continuous drying of a coated film such as an electrode coated film for lithium ion battery and an electrode coated film for photovoltaic power generation.

BACKGROUND ART

In a process for manufacturing an electrode coated film for lithium ion battery, an electrode coated film for photovoltaic power generation, and the like, there has been a drying method suitable for heat-drying workpieces with a coated film formed on a sheet surface thereof. The drying method is performed such that a plurality of infrared heaters 50 arranged in a furnace body 10 undergoes hot-air heating or infrared heating while the workpieces are moved inside of the furnace as shown in FIG. 1. As the infrared heater 50 used in such a furnace, a heater having a protection tube 52 around a filament 51 at a center as shown in FIG. 2 has been widely used (Patent Document 1). The reference number 53 refers to a supporting body of the filament 51.

Water, organic solvent and the like having intermolecular hydrogen bonds are included in components of a coated film. Due to this, in order to increase productivity of the coated film drying furnace, it is necessary to radiate a large quantity of heat in the furnace from the infrared heaters 50, and cause the water and organic solvent contained in the work to quickly evaporate.

Thus, conventionally, in a case of using the heater shown in FIG. 2, a method of rising a temperature of the filament 51 of the infrared heater 50 and increasing radiant energy thereof has been generally used. When the temperature of the filament 51 is risen, as shown in FIG. 3, it is known that a peak of a radiation spectrum transfers to a short wavelength side. Especially when the temperature of the filament 51 is made to be at 700° C. or more, a dominant wavelength of the radiation spectrum comes to 3.5 μm or less that is a near infrared range. Such a near infrared ray is said to have superior ability to cut off the intermolecular hydrogen bonds that hinder the evaporation; therefore, rising the temperature of the filament 51 of the infrared heater 50 is effective also from this respect. Note that, in the present description, a range in which the wavelength is at 3.5 μm or less will be referred to as the near infrared range.

However, when the filament temperature of the infrared heater 50 is risen, a temperature of the protection tube 52 surrounding a circumference thereof gradually rises, whereby the protection tube 52 itself becomes a radiator and radiates infrared rays. For example, when the temperature of the protection tube 52 is 300° C., as shown in FIG. 3, the work and furnace walls can be heated by the infrared rays with the dominant wavelength of 5 μm being radiated within the furnace. However, under such a condition, an amount of the radiant energy of the near infrared range of 3.5 μm or less as aimed is very small. Due to this, the hydrogen bonds cannot be cut. When the radiant energy of 3.5 μm or less is to be increased, radiant energy in a far infrared range also increases, whereby the work and the furnace walls are overheated. Further, the temperature may go beyond an ignition temperature of the evaporated organic solvent, and an explosion may occur.

Note that Patent Documents 2 to 4 describe infrared heaters for heating fluids. The heater of Patent Document 2 is a halogen heater and is inserted at a center of a transparent quartz tube. This transparent quartz tube has an inlet opening and outlet opening for gas to be heated and heats the gas flowing therein. Further, Patent Document 3 describes an infrared ray element that inserts a radiation tube, in which a tungsten heater is sealed inside a silica glass tube, into a cooling tube formed of silica glass and that performs heating while flowing liquid or gas to be heated in a passage formed between the radiation tube and the cooling tube. Further, Patent Document 4 describes a liquid heater that inserts a second hollow tube, in which a halogen lamp is sealed, into a first hollow tube having a flow-in section and a flow-out section for a fluid, and heats the fluid inside the first hollow tube. However, these are all heaters for heating the fluid flowing in a flow passage surrounding the heater and are not for heating a work inside a furnace.

Other than this, Patent Document 5 describes a furnace that provides a quartz protection tube at a center of a furnace body, puts an object to be heated therein, and performs heating to a high temperature of about 2000° C. by four infrared heaters arranged around the quartz protection tube. Cooling air is used to prevent protection tubes covering outer surfaces of the heaters from softening and deforming. However, Patent Document 5 also is for heating the contents of the quartz protection tube and is not for heating a work in a furnace, and in addition, a temperature range is completely different.

Further, Patent Document 6 discloses a vapor phase epitaxy device in which a double-tube type heater is arranged in a reaction chamber. This double-tube type heater reduces a surface temperature by cooling a space between an outer tube and an inner tube by air and prevents unnecessary deposition of reactant on a heater surface, and in addition mitigates thermal stress on a quartz glass configuring the outer tube. However, what is disclosed therein is a batch-type vapor phase epitaxy device, and is not a furnace for continuously drying a coated film having an absorption spectrum for electromagnetic waves of 3.5 μm or less and including water and organic solvent having the hydrogen bonds and the like. Further, in this vapor phase epitaxy device, walls inside the furnace are indirectly cooled by water, and energy radiation thereof is large; therefore, it is not economical for a large-scale continuous furnace. Accordingly, the prior art documents searched by the applicant do not disclose an art for efficiently drying a coated film having hydrogen bonds while suppressing a rise in temperature inside a furnace.

PRIOR ART DOCUMENTS

Patent Documents

Patent Document 1: Japanese Unexamined Patent Application Publication No. 2006-294337
Patent Document 2: Japanese Unexamined Patent Application Publication No. H8-35724
Patent Document 3: Japanese Unexamined Patent Application Publication No. 2004-273453
Patent Document 4: Japanese Patent No. 2583159
Patent Document 5: Japanese Unexamined Patent Application Publication No. S58-102482
Patent Document 6: Japanese Unexamined Patent Application Publication No. S62-97324

SUMMARY OF THE INVENTION

Problem to be Solved by the Invention

The purpose of the present invention is; to solve the aforementioned problem of the conventional techniques, and to provide a coated film drying furnace that suppresses an rise in temperature inside the furnace, intensively radiates near infrared rays having superior ability in cut off intermolecular hydrogen bonds for the work, and can heat dry the coated film continuously efficiently.

Means for Solving the Problem

The present invention devised to solve the above problems is a coated film drying furnace for drying a coated film inside a furnace body by conveying the coated film, the coated film drying furnace comprising: an infrared heater provided inside the furnace body, wherein: the coated film has an absorption spectrum for electromagnetic waves of 3.5 μm or less and has hydrogen bonds; the infrared heater has an outer circumference of a filament concentrically covered by a plurality of tubes that functions as a low pass filter; and the infrared heater has a structure in which a fluid flow passage is formed between the plurality of tubes. It should be noted that the coated film having the absorption spectrum for the electromagnetic waves of 3.5 μm or less and having the hydrogen bonds is for example an electrode coated film for lithium ion battery or an electrode coated film for photovoltaic power generation.

In the present invention, the fluid may be air, and a solvent volatilized from a work can effectively be discharged to outside the furnace by reintroducing the hot air discharged from the infrared heater arranged at a front half of the furnace body. Further, inner walls of the furnace body are preferably configured of a reflective material with a small infrared emissivity. Further, a radiation wavelength of the infrared heater may be controlled in accordance with a type of the fluid. Other than this, three tubes may be used as the tubes covering the outer circumference of the filament, and the fluid may be caused to flow in opposite directions in flow passages for the fluid formed between the respective tubes. Further, a plurality of fluid inlets/outlets may be formed in a longitudinal direction of the infrared heater.

Advantageous Effects of Invention

The coated film drying furnace of the present invention has the infrared heater in which the outer circumference of the filament is covered concentrically by the plurality of tubes that functions as the low pass filter, and has the structure in which the fluid flow passage is formed between the plurality of tubes at inside the furnace body. This infrared heater can radiate the infrared rays, which adjusts the peak wavelength of short wavelength of 3.5 μm or less by making the filament a high temperature of 700° C. or more and 1200° C. or less, and is effective for dryness of a coated film. Thereby, the infrared heater enables sufficient dryness also in a continuous furnace like a roll-to-roll type. Further, since only the wavelength of 3.5 μm or less that contributes in cutting the intermolecular hydrogen bonds is selected, the temperature rise inside the furnace due to a long wavelength greater than 3.5 μm does not occur, and effective drying of the coated film becomes possible. Further, since the heater surface temperature can be reduced accordingly, it can be used without a concern for ignition with respect to explosive volatile substances generated in an electrode drying step for lithium ion battery.

Further, if the air flowing in a flow passage 16 of the infrared heater as shown in FIG. 5 is supplied as hot air into the furnace at a back half of the furnace body, a work temperature at the back half portion of the furnace body can be prevented from increasing, a thermal contraction caused by a rapid temperature change to a room temperature that occurs at a drying furnace exit can be prevented, and energy loss can be reduced. Further, if the inner walls of the furnace body are configured by the reflective material with the small infrared emissivity, it can be prevented that the furnace walls absorb the infrared rays and become a heating element. This is beneficial in suppressing an atmospheric temperature in the furnace.

BEST MODE FOR CARRYING OUT THE INVENTION

Hereinbelow, embodiments of the present invention will be described in detail.

Figure 4:
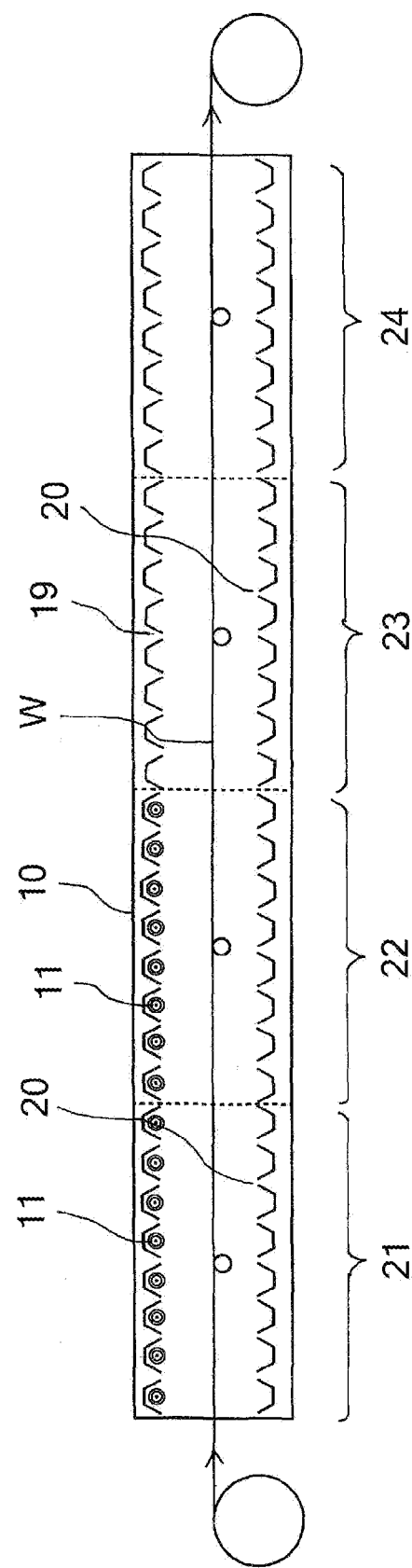
FIG. 4 is an explanatory diagram showing a first embodiment of the present invention.

FIG. 4 is an explanatory diagram showing a first embodiment of the present invention. 10 is a furnace body of a coated film drying furnace, an inside of which a film-shaped work W is continuously dried while being moved continuously in one direction. A coated film that has an absorption spectrum for electromagnetic waves of 3.5 μm or less and has hydrogen bonds is formed on a surface of the film-shaped work W. In this embodiment, the coated film is an electrode coated film for lithium ion battery.

Electrodes of the lithium ion battery are manufactured by applying an electrode material paste in which active material powder (electrode material) that is a positive electrode material or a negative electrode material is mixed with a binder, conductive material, and solvent, onto a metal sheet such as aluminum or copper so as to form a coated film with a thickness of about 100 μm to 300 μm and by drying the same. Electrode materials typically used are lithium cobalt oxide as the positive electrode material, PVDF as the binder, carbon as the conductive material, and NMP as the solvent. In this embodiment, although the lithium cobalt oxide is used as the electrode material for a positive electrode, it may be lithium nickelate or lithium manganese. Further, the electrode material for a negative electrode is, for example, graphite. These are all microparticle powders.

As described above, the binder is a component for adhering the electrode material and the carbon powder as the conductive material and, in this embodiment, is PVDF (polyvinylidene fluoride). The solvent in this embodiment is NMP (N-metyl-pyrrolidone). However, types of the binder and solvent are not limited to these, and various well-known substances may be used as constituent materials of the electrode coated film for lithium ion battery.

Figure 5:
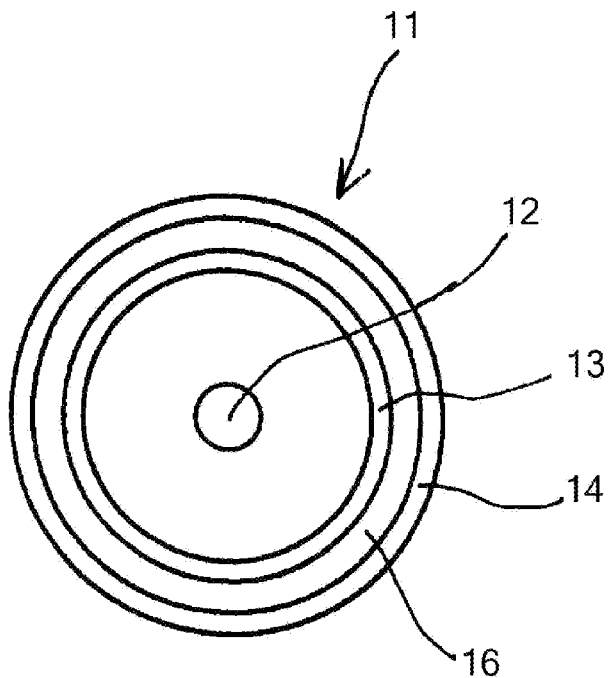
FIG. 5 is a cross sectional diagram of an infrared heater used in the first embodiment.
Figure 6:
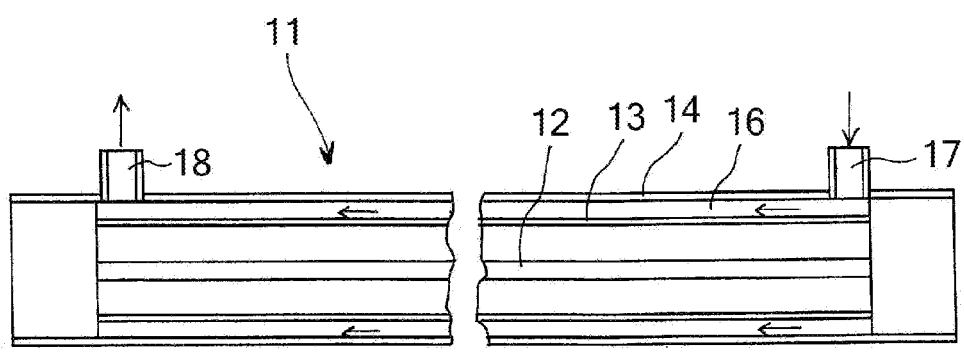
FIG. 6 is a cross sectional diagram of the infrared heater used in the first embodiment.
Figure 7:
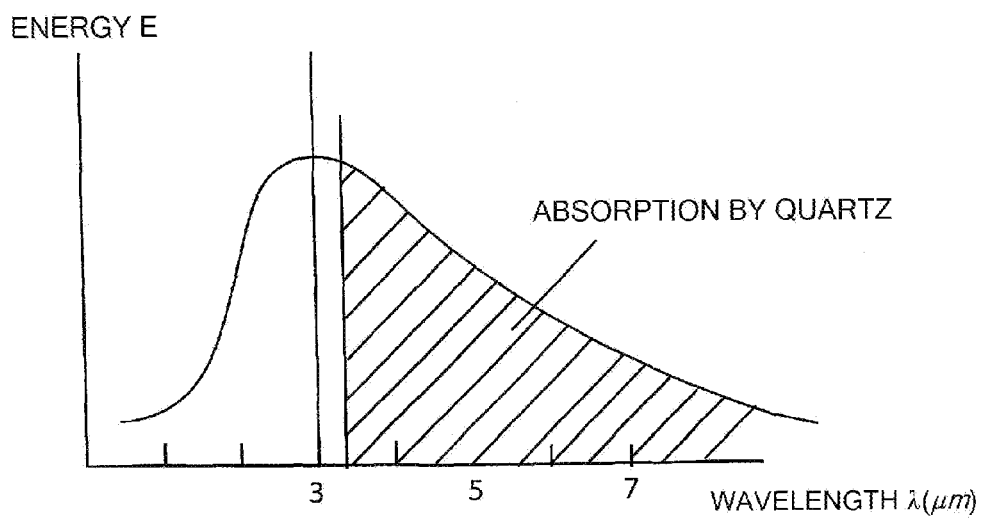
FIG. 7 is a graph showing a radiation spectrum of the infrared heater.

Infrared heaters 11 are arranged at appropriate intervals on furnace ceilings of a first zone 21 and a second zone 22 at a front half of the furnace body 10. As shown in FIGS. 5 and 6, these infrared heaters 11 have a structure in which an outer circumference of a filament 12 is concentrically covered by a plurality of tubes 13, 14, and a fluid flow passage is formed between the plurality of tubes. The inner tube 13 is a protection tube for the filament 12, and is a protection tube made of a quartz glass, borosilicate crown glass and the like, through which infrared rays can penetrate. Further, the outer tube 14 is a tube for flowing a fluid along an outer circumference of the inner tube 13, and these protection tubes have a function as a low pass filter for the electromagnetic waves, as shown in FIG. 7. Examples of material thereof include quartz glass and borosilicate crown glass, but use of quartz glass tubes is preferable as protection tubes excellent in heat resistance, thermal shock resistance and economic efficiency.

In a drying furnace for which an upper temperature limit is determined based on a product property, it is actually not so easy to perform control so that the infrared radiation with a short wavelength (3.5 μm or less), which is thought to be effective for drying the coated film, can become dominant. One reason thereof is that a temperature of a radiator primarily having this wavelength range reaches a very high level exceeding 700° C. due to the Planck's radiation law. A surface temperature of the heaters making contact with a flammable volatile organic solvent in a typical drying furnace is not allowed to exceed 700° C. Even if such a temperature were allowed, problems as follows would be expected from a logical aspect of the radiation. Firstly, radiations with the short wavelength are indeed radiated with priority from the high temperature radiator. On the other hand, however, radiant energy per unit area becomes enormous according to the Stefan-Boltzmann's law. Due to this, eventually a temperature rise exceeding a necessary level occurs at respective portions in the furnace, and it is impossible to establish a drying process aimed for mass production especially in terms of energy conservation and thermal resistance of products when transportation in the furnace is stopped.

With respect to this, with the heater having the shape as shown in FIGS. 5 and 6, a radiation area and a thermal capacity are both small due to the radiator having a threadlike filament shape; and in consideration per one heater, it means that it has a feature to "radiate a small amount of infrared rays with short wavelength" of a radiation source. That is, the temperature rise of the filament itself is easy, the temperature of the filament can be changed, and in addition a control of the radiation area in a unit volume of the furnace (total amount of generated energy) can easily be performed by adjusting a number of arranged heaters (pitch thereof). Further, since the filament electrically being conducted at 700° C. to 1200° C. decreases its temperature instantly when the electrical conduction is stopped; therefore, safety at the time of transportation stop in the furnace is significantly high. In addition to this feature, by further providing a tube cooling mechanism, the aforementioned problems are solved, and the control of the wavelength of the radiation inside the drying furnace on the premise of a wide variety of applications becomes possible.

The filaments 12 are electrically conducted and heated at 700° C. to 1200° C., and the infrared rays having their peak of wavelength at around 3 μm are radiated. However, since the quartz glass, the borosilicate crown glass, and the like have the function as the low pass filter that penetrates the infrared rays with the wavelength of 3.5 μm or less and absorbs the infrared rays with the wavelength of 3.5 μm or more, the tube 13 and the tube 14 selectively allow the infrared rays with the wavelength that is less than 3.5 μm among the electromagnetic waves radiated from the filaments 12 to penetrate and be supplied in the furnace. Energy of the infrared rays in this wavelength range is easily absorbed directly in the solvent such as the NMP and is converted into heat. In addition, since a vibration frequency thereof matches that of the intermolecular hydrogen bonds in the solvent or water, the electrode coated film for lithium ion battery can be dried with high efficiency.

By contrast, since the tube 13 and the tube 14 serve as absorbers of the radiation in the long wavelength range greater than 3.5 μm, they rise their temperature by absorbing the infrared energy. Since a large amount of infrared rays in the long wavelength range greater than 3.5 μm is being radiated from the filaments 12 at the aforementioned temperature, the tube temperature (temperature of a contacting point with the flammable volatile organic solvent) may rise. As a result, the tubes themselves become the radiators of the infrared rays, and secondarily radiate the infrared rays primarily with the long wavelength greater than 3.5 μm. As a result, in the case of the electrode coated film for lithium ion battery, the temperatures of the respective sections of the furnace may be risen above the ignition temperature of the solvent.

Therefore, in the present invention, a fluid is caused to flow in a space 16 between the tube 13 and the tube 14, and the energy of the infrared rays of the long wavelength range that are once absorbed in the tube 13 and the tube 14 is converted in a form of a convection heat transfer and can be removed out of the system by transferring the same to the fluid. As a result, the wavelength of the infrared rays eventually supplied in the furnace can be restricted to the short wavelength range; and even under a circumstance in which the filaments 12 are continuously and electrically conducted and heated at a high temperature, in the tube 13 and the tube 14, especially in the electrode coated film for lithium ion battery, the tube 14 that makes direct contact with the volatile organic solvent can be maintained at 200° C. or lower, which is a safe temperature (that is at the ignition temperature of the solvent or lower) and preferably at 150° C. or lower. The fluid may be air, inactive gas and the like, but in the present embodiment, air is blown in from a fluid supply port 17, and heated air is taken out from a fluid exhaust port 18. Note that the air taken out from the fluid exhaust port 18 may, in some cases, be hot air of 100° C. or higher; therefore, it is preferable to provide it in the furnace from a hot air slit 20 as a part of hot air for float conveying at the back half portion.

The infrared heaters 11 having such a structure can selectively supply the infrared rays with the wavelength of less than 3.5 μm into the furnace, and since the surface temperature of the infrared heaters 11 is kept at a low temperature of, for example, 200° C. or lower, the temperature inside the furnace can be 200° C. or lower, and preferably 150° C. or lower. Due to this, there is no risk of the ignition or explosion of the solvent. Further, if the inner walls of the furnace body 10 are configured by a reflective material with a small infrared emissivity, the temperature rise in the furnace walls can be more effectively suppressed. As such a material, for example, a lustrous stainless steel plate may be used.

Other than the aforementioned infrared heaters 11, inside the furnace at the first zone 21 and the second zone 22 at the front half, a plurality of hot air slits 19 for blowing hot air onto the electrode coated film for lithium ion battery is provided. The hot air slits 19 at the ceiling section are arranged to blow the hot air from between the infrared heaters 11. The hot air slits 20 at a lower side blow the hot air onto a lower surface of the electrode coated film for lithium ion battery.

The coated film drying furnace of the present embodiment performs the drying of the electrode coated film for lithium ion battery with the first zone 21 shown in FIG. 4 being as an initial state, the second zone 22 being as an intermediate state, and third and fourth zones 23, 24 being as a finishing state. It goes without saying that the temperature of the infrared heaters 11 in the respective zones and the hot air temperature therein are independently controlled. Note that, in this embodiment, the infrared heaters 11 are not provided in the third zone 23 and the fourth zone 24 and only the hot air drying is performed therein; however, the infrared heaters 11 may be arranged at wider areas.

Representative setting examples of the heaters are shown in Tables 1 and 2. As the setting temperature of the heater surface temperature, the temperature of the outer tubes 14 is shown instead of the filament temperature. Primary portions of the radiated infrared rays are radiated from the filaments at the respective centers, and come out by penetrating through the tubes 14; therefore, even if the temperature of the tubes 14 is low, there is no problem with respect to a heating effect. Rather, this indicates that the contacting sections of the heaters with the fluid inside the furnace are kept at the safe temperature or lower, as aforementioned. In the actual operation, it is also possible to perform control based on electric power (w) for the heaters and a gas flow rate.

TABLE 1

Electrode Coated Film for Lithium Ion Battery

|  | Heater Surface Temperature | Filament Temperature | Coated Film Temperature |
| --- | --- | --- | --- |
| Known Method | 380° C. | 1000° C. | 155° C. |
| Present Application | 120° C. | 1000° C. | 150° C. |

TABLE 2

Electrode Coated Film for Photovoltaic Power Generation

|  | Heater Surface Temperature | Filament Temperature | Coated Film Temperature |
| --- | --- | --- | --- |
| Known Method | 450° C. | 1000° C. | 210° C. |
| Present Application | 190° C. | 1000° C. | 200° C. |

Note that an electrode coated film for photovoltaic power generation also is a coated film having the absorption spectrum of the electromagnetic waves of 3.5 µm or less and having the hydrogen bonds; therefore, it can be dried in the coated film drying furnace of the present invention similar to the aforementioned electrode coated film for lithium ion battery.

Figure 8:
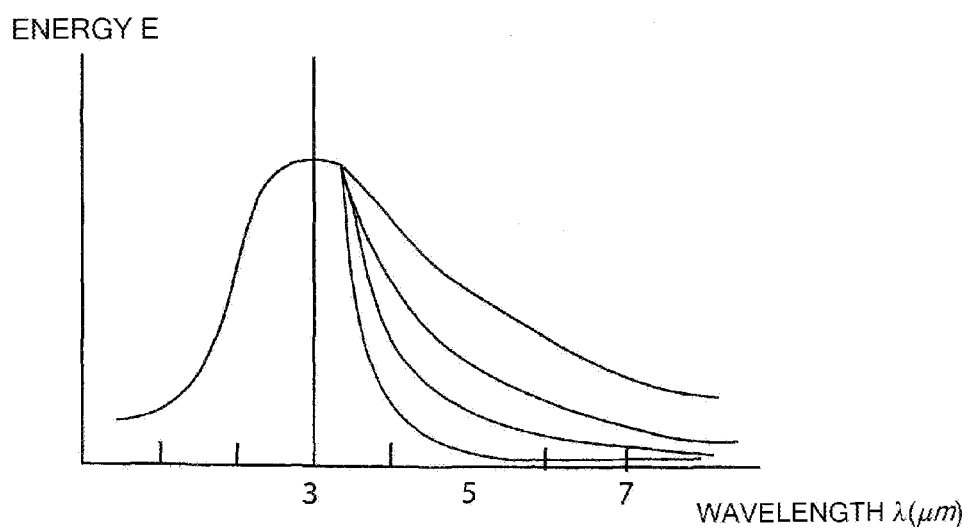
FIG. 8 is a graph showing a relationship between a surface temperature and the radiation spectrum of the infrared heater.

Further, in the present invention, the type and flow rate of the fluid can be arbitrarily controlled. As shown in FIG. 8, by increasing or decreasing the flow rate of the fluid, the surface temperature of the infrared heaters 11 can be changed, and the radiation spectrum of 3.5 µm or more can be adjusted. By using this, it becomes possible to change a temperature balance in a longitudinal direction of the furnace body while making the radiating wavelength identical among the infrared heaters 11. For example, in a zone where the intermolecular hydrogen bonds should actively be cut off, it becomes possible to shift the ways of use by enhancing cooling of the infrared heater 11 and radiating the near infrared rays onto the work W, and thereafter mitigating the cooling to rise the temperature of the entire work.

Figure 9:
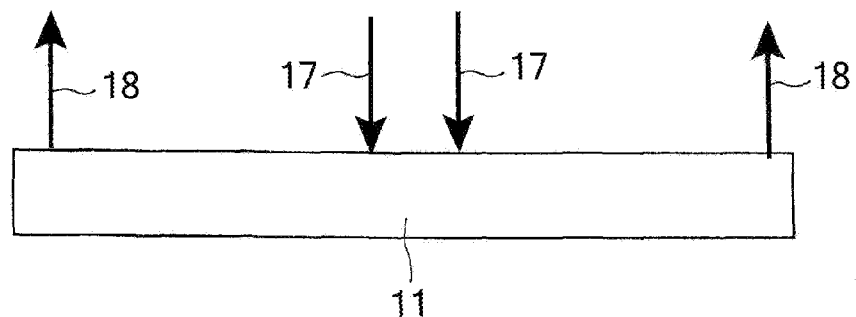
FIG. 9 is an explanatory diagram showing a second embodiment of the present invention.

FIG. 9 is an explanatory diagram of a second embodiment of the present invention, having a structure in which an infrared heater 11 has a plurality of fluid supply ports 17 and a plurality of fluid exhaust ports 18 in its longitudinal direction. In FIG. 9, the fluid supply ports 17 are provided at two positions at a middle portion, and a fluid flows toward outside and is discharged from the fluid exhaust ports 18 at both ends.

Figure 10:
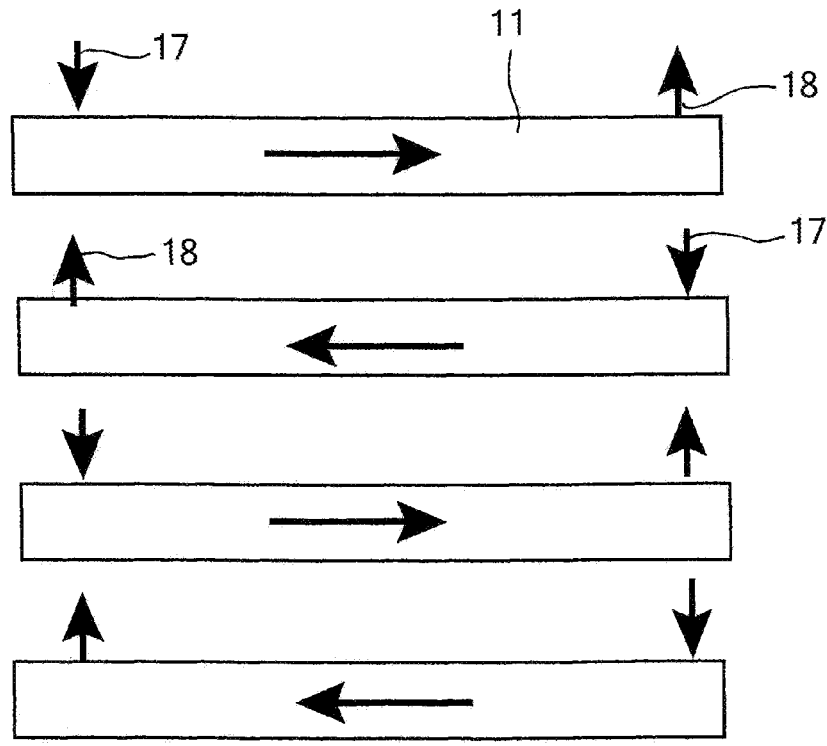
FIG. 10 is an explanatory diagram showing a third embodiment of the present invention.

FIG. 10 is an explanatory diagram of a third embodiment of the present invention, and is a plan view of infrared heaters 11. In the third embodiment, each infrared heater 11 has a fluid supply port 17 at one end and a fluid exhaust port 18 at the other end, respectively, but a fluid flow direction is set to be alternately opposite. Due to this, even if a temperature gradient is present in the infrared heaters 11 in a furnace width direction, it is possible to mitigate an influence thereof on a work W.

Figure 11:
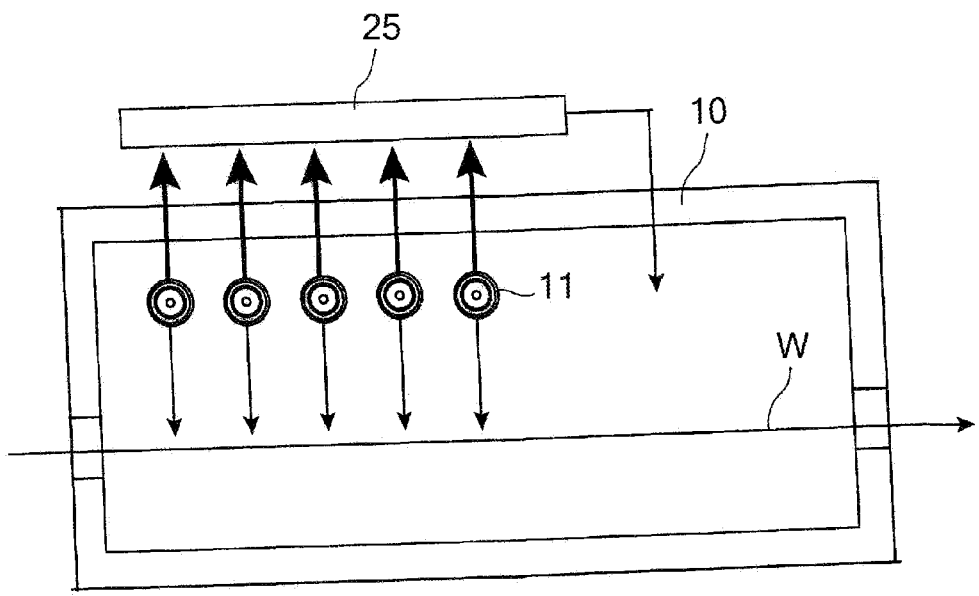
FIG. 11 is an explanatory diagram showing a fourth embodiment of the present invention.

FIG. 11 is an explanatory diagram of a fourth embodiment of the present invention, which collects air from respective infrared heaters 11 provided at a front half section of a furnace body 10 to a header 25, and blows in the same into an inside of the furnace body 10 from a supply port arranged at a back half section of the furnace body 10. The fluid having flown through flow passages 16 of the respective infrared heaters 11 is heated to about 100 to 200° C. Therefore, by blowing this into other zones of the furnace body 10, a solvent gas inside the furnace can be pushed out without disturbing a temperature distribution in the furnace. Thus, an excessive rise in the work temperature at the back half section of the furnace body can be prevented, and a thermal contraction caused by a rapid temperature change at a drying furnace exit with a room temperature can also be prevented.

Figure 12:
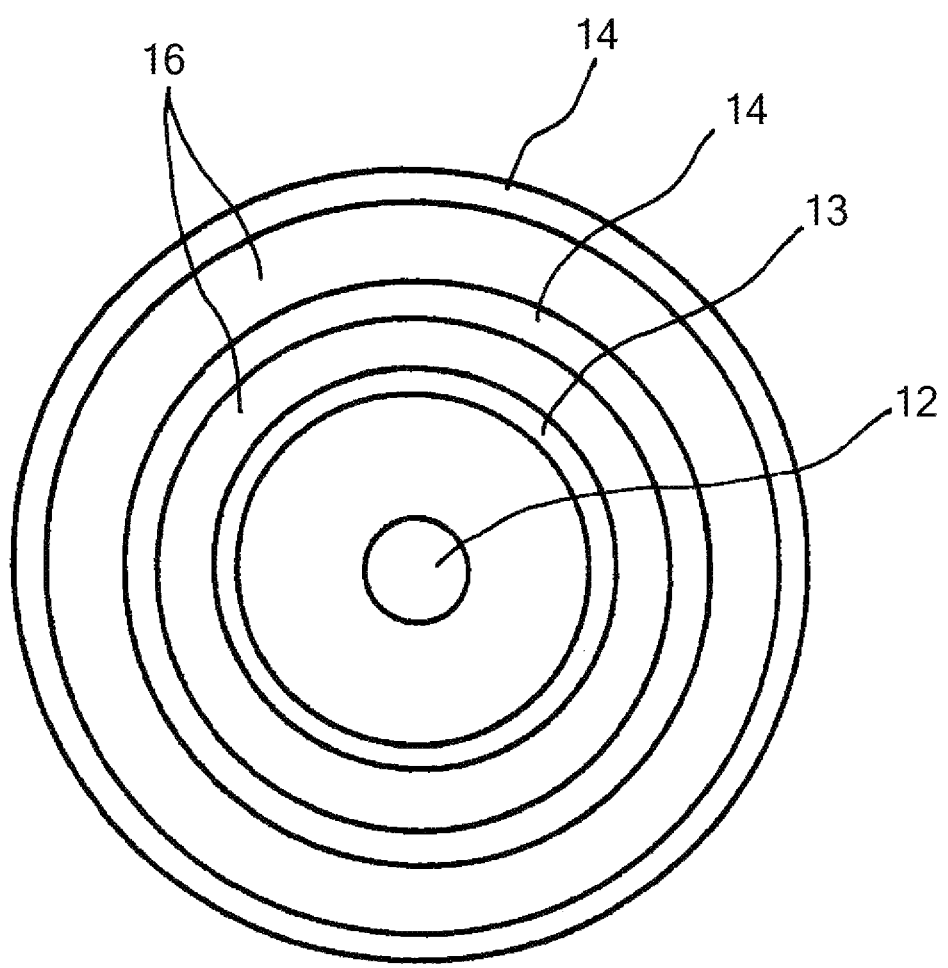
FIG. 12 is an explanatory diagram showing a fifth embodiment of the present invention.

FIG. 12 is an explanatory diagram of a fifth embodiment of the present invention, in which three tubes are used as the tubes covering an outer circumference of a filament 12. Different types of fluids or the same type of fluid may be caused to flow in two fluid flow passages 16 formed between those tubes. In either case, if a fluid flow direction of is made opposite on the outside and inside, an effect of equalizing a temperature distribution along a longitudinal direction of the infrared heater 11 can be obtained.

Figure 13:
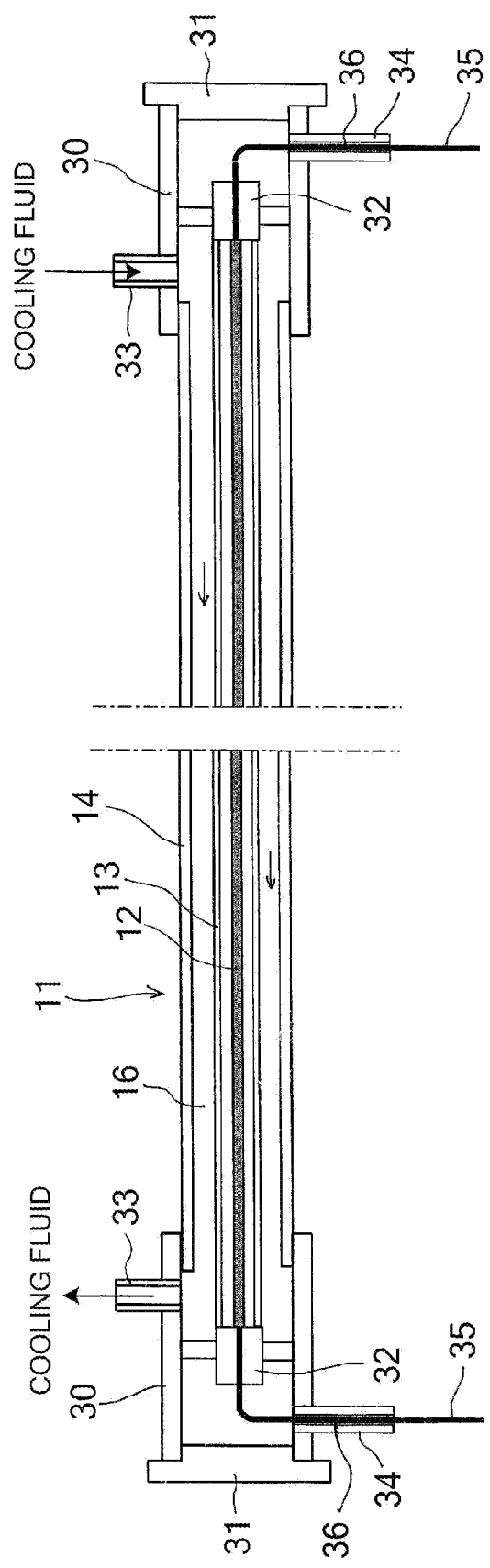
FIG. 13 is a cross sectional diagram of a specific infrared heater.

As aforementioned, in the present invention, the infrared heaters 11 having the outer circumferences of the filaments 12 covered concentrically by the plurality of tubes 13, 14 are used. However, in applying this configuration to industrial use, the aforementioned function must be ensured, a manufacturing cost must be as low as possible, maintenance must be easy, and high safety must be ensured. FIG. 13 is a diagram showing a more specific structure of the infrared heater 11. This infrared heater 11 retains both ends of an outer tube 14 by a pair of bottomed cylindrical bodies 30. The outer tube 14 is a quartz glass tube, and the bottomed cylindrical bodies 30 are preferably made of metal. Each of the bottomed cylindrical bodies 30 has a cap 31 attached air-tight at an outer end of a cylindrical section. Holders 32 are arranged inside these bottomed cylindrical bodies 30, and inner tubes 13 are supported at center positions of the outer tubes 14 by these holders 32. The inner tubes 13 have filaments 12 inside the quartz glass tube, and commercially-available straight type heaters can be used as they are.

These bottomed cylindrical bodies 30 each have a fluid outlet/inlet 33. The fluid such as air is supplied from the fluid outlet/inlet 33 of either of the bottomed cylindrical bodies 30, cools the tubes 13, 14 while flowing through a fluid flow passage 16 formed between the outer tube 14 and the inner tube 13, and is discharged from the fluid outlet/inlet 33 of the other bottomed cylindrical body 30.

Further, these bottomed cylindrical bodies 30 are provided with short tube-shaped wiring passage sections 34. An electric wiring 35 connected to the filament 12 of the inner tube 13 is extended to outside through the wiring passage sections 34. However, insides and outsides of the bottomed cylindrical bodies 30 are insulated by forming sealing sections 36 on the wiring passage sections 34, and a furnace atmosphere is prevented from making a direct contact with the electric wiring 35. Since a periphery of the filament 12 comes to be at a high temperature, a contact with the furnace atmosphere is prevented by this structure, and a risk of explosion is prevented.

In the infrared heater 11 having such a structure, a commercially-available straight type heater can be used as it is; therefore, it can be manufactured at a relatively low cost by combining the straight type heater with the quartz tube having a diameter corresponding to a necessary flow rate. Further, even in a case where the filament 12 snaps, the maintenance property thereof is superior because replacement thereof can easily be performed by detaching the cap 31 and taking out the inner tube 13. Further, the flow rate adjustment can easily be performed; therefore, it is easy to control the surface temperature of the infrared heater 11. Further, since the fluid passes through insides of the bottomed cylindrical bodies 30, the sealing sections 36 of the electric wiring 35 are not heated excessively. The infrared heater 11 described above can improve the maintenance property, and injection and discharge of the fluid becomes easy by arranging the pair of bottomed cylindrical bodies 30 to be positioned outside the furnace walls.

EXAMPLES

Figure 1:
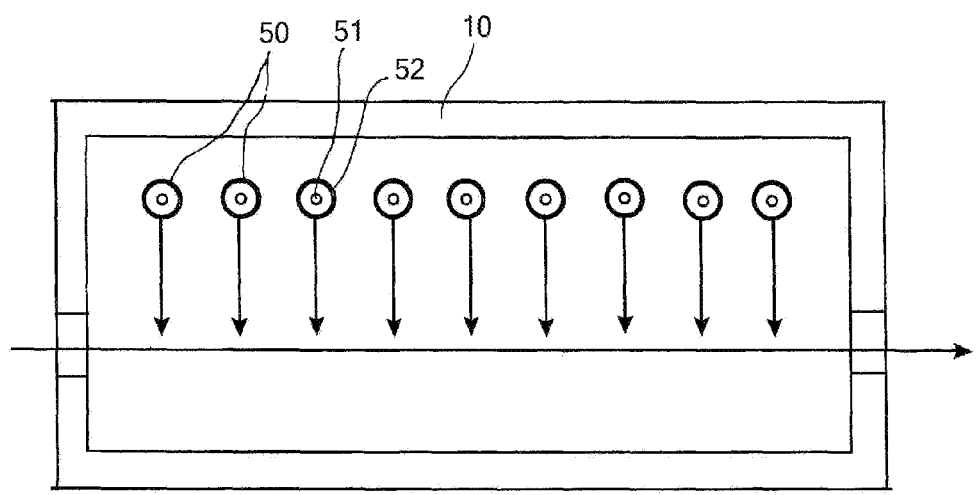
FIG. 1 is an explanatory diagram of a known coated film drying furnace.
Figure 2:
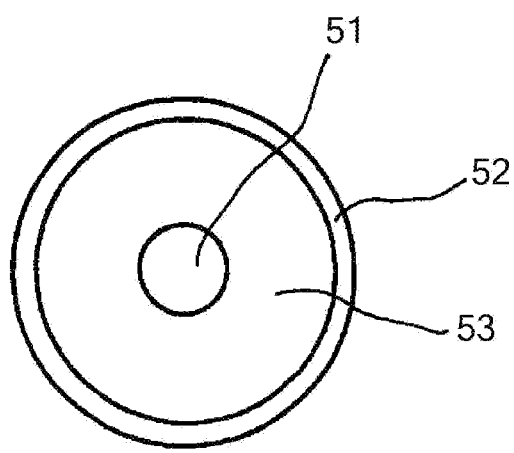
FIG. 2 is a cross sectional diagram of a known infrared heater.
Figure 3:
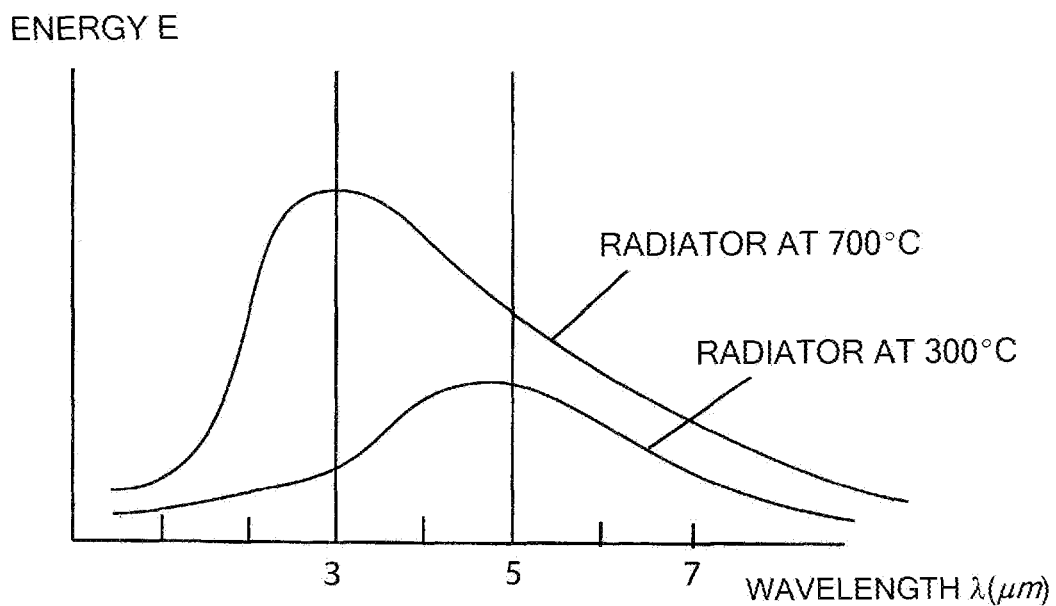
FIG. 3 is a graph showing a radiation spectrum of the infrared heater.

A furnace body with a length of 4 m was divided into two zones of front and back with 2 m each, 19 infrared heaters having the cross sectional structure shown in FIG. 2 were arranged on a furnace ceiling section at a 0.1 m pitch in the 2 m portion on the front side. A height of a furnace chamber was 0.3 m, and a height at which the infrared heaters were provided was 0.25 m. Further, a material of an outer circumference tube of each infrared heater was a quartz glass, with a diameter of 20 mm. A filament temperature of the infrared heaters was set at 850° C., and air was flown on an outer circumference thereof to maintain an outer surface temperature of the infrared heaters at 187° C. Note that the injected air was at 20° C. when starting to flow, but was at 129° C. when coming out from the infrared heaters. Spectrums of infrared rays radiated from the infrared heaters were measured, and near infrared rays with a peak wavelength of 3.2 μm were being radiated. Further, a temperature of furnace walls reached a steady state at 183° C., and was maintained at a lower temperature than 200° C., at which a solvent explosion may occur.

Note that, in a conventional type of drying furnace, a heater temperature needs to be at 460° C. in order to maintain a furnace wall temperature at 200° C. or lower, in which case a peak wavelength was 4.2 μm. A conventional type of coated film drying furnace cannot be used for drying the coated films because the solvent vapor may explode.

EXPLANATION OF SYMBOLS

W Work
10 Furnace body
11 Infrared heater
12 Filament
13 Tube
14 Tube
16 Space
17 Fluid supply port
18 Fluid exhaust port
19 Hot air slit
20 Hot air slit
21 First zone
22 Second zone
23 Third zone
24 Fourth zone
25 Header
30 Bottomed cylindrical body
31 Cap
32 Holder
33 Fluid outlet/inlet
34 Wiring passage sections
35 Electric wiring
36 Sealing sections
50 Conventional infrared heater
51 Filament
52 Protection tube
53 Supporting body

The invention claimed is:

1. A coated film drying furnace for drying a coated film inside a furnace body by conveying the coated film, the coated film drying furnace comprising:
    an infrared heater provided inside the furnace body, wherein:
    the coated film has an absorption spectrum for electromagnetic waves of 3.5 μm or less and has hydrogen bonds;
    the infrared heater has an outer circumference of a filament concentrically covered by a plurality of tubes that functions as a low pass filter; and
    the infrared heater has a structure in which a fluid flow passage is formed between the plurality of tubes and a port is placed inward from holders positioned at ends of the filament so that the fluid flow passage is exhausted outside of the furnace.

2. The coated film drying furnace according to claim 1, wherein
    the coated film having the absorption spectrum for the electromagnetic waves of 3.5 μm or less and having the hydrogen bonds is an electrode coated film for lithium ion battery or an electrode coated film for photovoltaic power generation.

3. The coated film drying furnace according to claim 1, wherein
    the fluid is air, and
    hot air discharged from the infrared heater arranged at a front half of the furnace body is supplied in the furnace at a back half of the furnace body.

4. The coated film drying furnace according to claim 1, wherein
    inner walls of the furnace body is configured of a reflective material with a small infrared emissivity.

5. The coated film drying furnace according to claim 1, wherein a radiation wavelength of the infrared heater is controlled in accordance with a type of the fluid.

6. The coated film drying furnace according to claim 1, wherein three tubes are used as the tubes covering the outer circumference of the filament, and the fluid is caused to flow in directions opposite to each other in flow passages for a fluid formed between the respective tubes.

7. The coated film drying furnace according to claim 1, wherein a plurality of fluid inlets/outlets is formed in a longitudinal direction of the infrared heater.

\* \* \* \* \*